(12) United States Patent
Triller et al.

(10) Patent No.: US 8,495,875 B2
(45) Date of Patent: Jul. 30, 2013

(54) TURBOCHARGER FOR AN INTERNAL COMBUSTION ENGINE

(75) Inventors: Andreas Triller, Bühl (DE); Andreas Englisch, Bühl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 396 days.

(21) Appl. No.: 12/806,234

(22) Filed: Aug. 6, 2010

(65) Prior Publication Data

US 2011/0036089 A1 Feb. 17, 2011

(30) Foreign Application Priority Data

Aug. 6, 2009 (DE) .................. 10 2009 036 425

(51) Int. Cl.
*F02B 33/44* (2006.01)
(52) U.S. Cl.
USPC ............................................................ 60/608
(58) Field of Classification Search
USPC .................................................... 60/607–609
See application file for complete search history.

(56) References Cited

U.S. PATENT DOCUMENTS

| | | | | |
|---|---|---|---|---|
| 3,007,302 A * | 11/1961 | Vincent | ............................ | 60/598 |
| 3,188,479 A * | 6/1965 | Wood et al. | .................... | 290/4 R |
| 4,745,755 A * | 5/1988 | Kawamura | ....................... | 60/608 |
| 4,958,497 A * | 9/1990 | Kawamura | ....................... | 60/608 |
| 5,105,624 A * | 4/1992 | Kawamura | ....................... | 60/608 |
| 5,418,399 A * | 5/1995 | Klaue | ........................... | 290/1 R |
| 5,678,407 A * | 10/1997 | Hara | ............................... | 60/608 |
| 6,629,024 B2 * | 9/2003 | Tabata et al. | ..................... | 701/22 |
| 7,214,154 B2 * | 5/2007 | Klemen et al. | ..................... | 475/5 |

FOREIGN PATENT DOCUMENTS

WO WO 2005124121 A1 * 12/2005

* cited by examiner

*Primary Examiner* — Thomas Denion
*Assistant Examiner* — Ngoc T Nguyen
(74) *Attorney, Agent, or Firm* — Alfred J. Mangels

(57) ABSTRACT

A turbocharger for an internal combustion engine, in which a mechanical energy flow can be generated from an exhaust gas flow of the internal combustion engine for providing engine intake airfow under pressure. The turbocharger includes a mechanical energy converter connected between the exhaust gas flow and the intake airflow, by which converter the mechanical energy flow can be transferred and transmitted. The turbocharger also includes an electrical energy converter associated with the mechanical energy flow for converting mechanical energy into electrical energy, or vice versa, to enable improved intake airflow charging of an internal combustion engine. By means of the electrical energy converter, an electrical energy flow can be selectively branched off to a battery or fed into the mechanical energy flow.

16 Claims, 8 Drawing Sheets

TURBOCHARGER FOR AN INTERNAL COMBUSTION ENGINE

BACKGROUND OF THE INVENTION

1. Field of the Invention

The present invention relates to a turbocharger for an internal combustion engine, by which a mechanical energy flow of intake air for the internal combustion engine can be generated from an exhaust gas flow by means of a mechanical energy converter connected between the exhaust gas flow and the intake airflow, whereby the mechanical energy flow can be transferred and transmitted, and includes a method for operating the turbocharger.

2. Description of the Related Art

Turbochargers for internal combustion engines are well known. By means of the mechanical energy flow contained in the exhaust gas flow, it is possible to utilize that energy to boost the pressure of the intake airflow into the internal combustion engine. A system for controlling an electrically supported turbocharger is disclosed in U.S. Pat. No. 6,705,084 B2, in which the turbocharger includes a shaft that can rotate in a specified direction during the operation of the turbocharger, and is coupled to an internal combustion engine. For the electrical support of the turbocharger, the system includes an electric motor actuated by an electric motor controller. A further turbocharger with an electrical rotation machine is disclosed in U.S. Pat. No. 6,943,468 B2.

It is an object of the present invention to provide improved turbocharging for an internal combustion engine, particularly regarding uniformly and/or adequately high charging pressure over a possibly wide speed range of the internal combustion engine as well as at a high energy efficiency.

SUMMARY OF THE INVENTION

The object is achieved by a turbocharger for an internal combustion engine, by means of which mechanical energy flow can be generated from exhaust gas flow for increasing intake airflow of the internal combustion engine. A mechanical energy converter is connected between the exhaust gas flow and the intake airflow, by means of which the mechanical energy flow is transmittable and convertible. An electrical energy converter is provided for converting electrical energy into mechanical energy, or vice versa, which can be associated with the mechanical energy and by means of which an electrical energy flow can be branched off from or fed into the mechanical energy flow. Advantageously, the mechanical energy flow can be transmitted such that optimum energy transfer from the exhaust gas flow into the intake airflow of the internal combustion engine is possible. In addition, mechanical energy can be fed by means of the electrical energy converter if the energy available in the exhaust gas flow, for instance in the form of heat energy, pressure energy, and/or kinetic energy, does not suffice. That is especially the case at low speeds and/or light loads of the internal combustion engine. If the energy available in the exhaust gas flow is too high, the excess can be utilized advantageously by means of the electrical energy converter. Thus it must not be rendered useless and dissipated, for instance, by blowing off by means of a valve associated with the intake airflow.

In an exemplary embodiment of the turbocharger, the mechanical energy converter can include a variable planetary transmission (CVT planetary gear transmission) having a continuously variable transmission ratio to provide a transmission ratio. It is advantageously possible to transmit the mechanical energy by means of the energy converter so that it is adapted to the speed and/or the energy content of the exhaust gas flow and/or the intake airflow. It is therefore possible to exploit the energy available in the exhaust gas flow advantageously and optimally, and to branch it off by means of the electrical energy converter, if necessary, so that it is not lost.

In a further exemplary embodiment of the turbocharger, the variable planetary transmission can include a first transmission stage and a second transmission stage, whereby the electrical energy converter is connected between the transmission stages. The mechanical energy can be taken or supplied between the transmission stages advantageously so that, for instance, the transmission stages are actuated such that at constant torque, the mechanical energy is taken off or fed in by means of an increase or decrease of speed.

The object of the invention is also achieved by means of a method for operating a turbocharger, especially the turbocharger described above. The transfer and transmission of mechanical energy from the exhaust gas flow to the intake airflow is achieved by means of a mechanical converter by selective branching off or supply of an electrical energy flow into the mechanical energy flow by means of an electrical converter associated with the mechanical energy flow for converting the electrical energy into mechanical energy, or vice-versa. Advantageously, the mechanical energy flow, if necessary, can be based on demand, or be increased or lowered by feeding in or by branching off the electrical energy flow so that the necessary energy quantity is always available advantageously to the intake airflow, independent of the rotational speed of the internal combustion engine.

In an embodiment of the method, a stepless transmission of the mechanical energy flow is provided, or a stepless transmission of the mechanical energy flow is provided by means of a variable planetary gear transmission (CVT-planetary-gear transmission) having a continuously variable transmission ratio. The mechanical energy flow can advantageously be adapted steplessly at an operating state of the internal combustion engine, particularly at a rotational speed and/or a load, and thus to accommodate the exhaust gas flow and the necessary intake airflow.

In a further embodiment of the method, transmission of mechanical energy at high speed, if the rotational speed of the internal combustion engine falls below a threshold speed, the electrical energy feed as well as the transmission of the mechanical energy are fed at low speed. If the rotational speed of the internal combustion engine exceeds the threshold speed, at the same time branching off of the electrical energy flow is provided. In spite of an increase in the rotational speed of the internal combustion engine, an excessive increase of a quantity of energy fed to the intake airflow can be counteracted advantageously, whereby excess energy must not be dissipated wastefully.

In a further embodiment of the method, stepless transmission of mechanical energy is such that a compressor speed of a compressor associated with the intake airflow through an increasing speed characteristic of the internal combustion engine, in comparison with an exhaust gas turbine speed of an exhaust gas flow turbine associated with the exhaust gas, initially increases disproportionately, then increases underproportionately and then slightly falls in the end. Advantageously, such fresh-air charging pressure that can also be generated by the compressor at low speeds of the internal combustion engine can be provided or set up quickly. To increase the speeds, an excessively increasing charging pressure can be avoided advantageously, whereby the excess energy available in the exhaust gas flow can be removed advantageously by means of the electrical energy converter.

In a further embodiment of the method is the control of the electrical energy flow and transmission of the mechanical energy flow such that the exhaust gas turbine speed increases proportionally to the engine speed. Advantageously, the exhaust-gas turbine speed can be adapted to the exhaust gas flow growing with the engine speed, whereby an efficiency of the exhaust gas turbine and/or a corresponding exhaust gas pressure upstream can be adapted advantageously and optimally to the exhaust gas turbine energy.

In a further embodiment of the method, branching of the electrical energy flow to an electrical energy accumulator and/or to an electrical energy source and/or to an electrical energy sink and/or a rechargeable battery is provided. Advantageously, the electrical energy flow can be provided and/or maintained, whereby the electrical energy fed in is generated, if necessary, from an accumulator and/or stored in a different direction for later disposition.

In a further embodiment of the method, control of the electrical energy flow by means of power electronics and/or control of the electrical energy converter are/is provided by means of the power electronics. The power electronics can be associated with a corresponding engine control device and/or part of the control device. Advantageously, the electrical energy flow and the electrical converter can be adapted to the operating state of the internal combustion engine by means of power electronics.

The object of the invention is also achieved by an internal combustion engine having a previously-described turbocharger and/or designed, set up and/or constructed for executing a predetermined method. The advantages earlier described are achieved.

BRIEF DESCRIPTION OF THE DRAWINGS

Further advantages, includes and details of the invention result from the following description, in which, with reference to the drawings, different exemplary embodiments are described in detail. Same, similar and/or functionally the same parts are provided with the same reference numeral. The drawing figures show.

DESCRIPTION OF THE PREFERRED EMBODIMENTS

Figure 1:
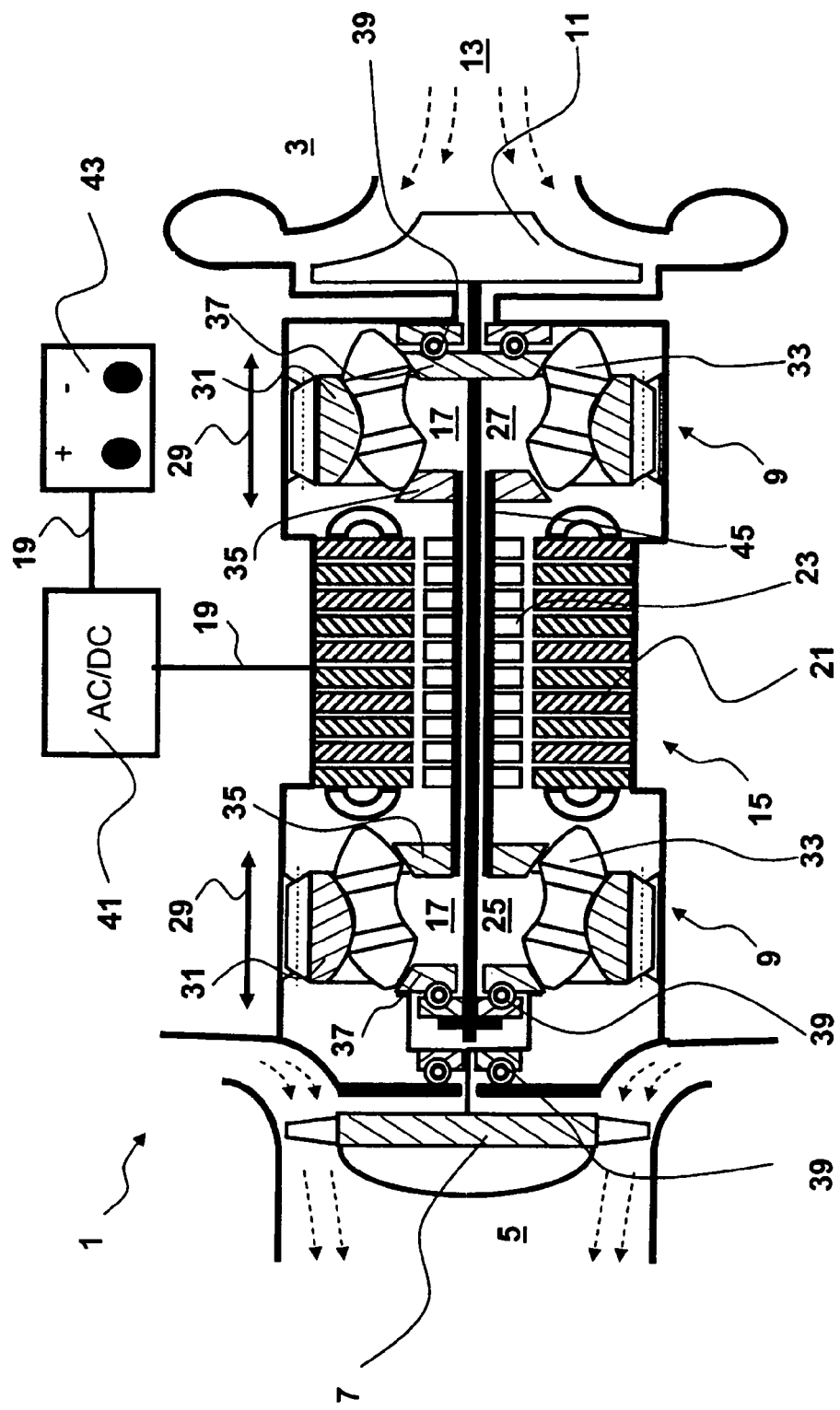
FIG. 1 a schematic representation of a longitudinal section of a turbocharger with a two-stage, variably adjustable planetary gear transmission.

FIG. 1 shows a turbocharger 1 for an internal combustion engine indicated by the reference numeral 3. The internal combustion engine 3 generates an exhaust gas flow 5. The exhaust gas flow 5 is guided through an exhaust gas turbine 7, by means of which the energy contained in the exhaust gas flow is converted into mechanical energy. The mechanical energy is transmitted from exhaust gas turbine 7 by means of a mechanical energy converter 9 to a compressor 11. By means of the compressor 11, the mechanical energy is transmitted to an intake airflow 13 of the internal combustion engine 3. The intake airflow 13 is fed to the combustion chambers (not shown) of the internal combustion engine 3 under pressure produced by means of the compressor 11.

An electrical energy converter 15 is associated with the mechanical energy converter 9. By means of the electrical energy converter 15, an electrical energy flow 19 can be branched off or fed in selectively by means of the mechanical energy flow 17 transferable by the mechanical energy converter 9 between the exhaust gas turbine 7 and the intake airflow 13. The electrical energy converter 15 is an electric motor with a stator 21 and a rotor 23. The stator 21 is non-rotatably connected with a housing of the turbocharger 1. The rotor 23 is rotatably mounted and is connected between a first transmission stage 25 and a second transmission stage 27 of the mechanical energy converter 9. By means of two double arrows 29, it is indicated that the transmission stages 25 and 27 feature a variably adjustable transmission ratio. Each of the transmission stages 25 and 27 includes a ring gear 31 that is disposed non-rotatably though axially displaceably on the housing of the turbocharger 1 for adjusting the respective transmission, which is indicated by means of the double arrows 29 in FIG. 1. A plurality of double conical rolling members 33, as planetary members, is associated with the respective ring gears. The rolling members 33 are associated with a respective inner conical sun wheel 35 and an outer conical sun wheel 37. The transmission stages 25 and 27 additionally serve as a radial support of the exhaust gas turbine 7 and of the compressor 11. The axial support is provided by means of three axial bearings 39.

Figure 3:
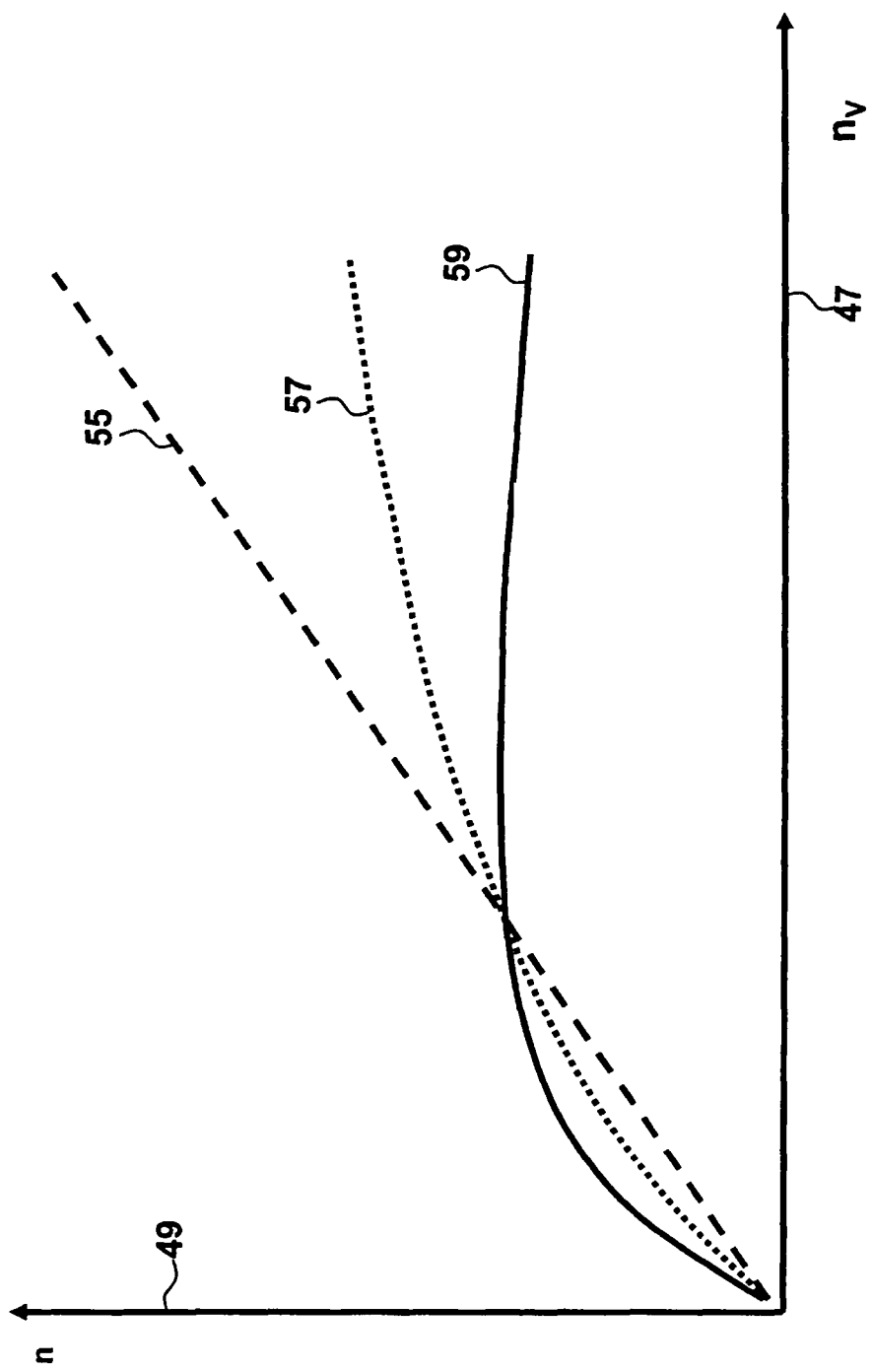
FIG. 3 a speed characteristic of the stages of the planetary gear transmission shown in FIG. 1 as a function of the engine rotational speed of an internal combustion engine equipped with the turbocharger.

Regarding the exact function of the transmission stages 25 and 27 of the mechanical energy converter 9, reference is made to the unpublished application by the same applicant, with the internal file number P080026/00, whose content, particularly FIG. 3 as well as the description of pertinent Figures, is referred to in this application.

The electrical energy converter 15 as well as the electrical energy flow 19 can be actuated by means of power electronics 41. The power electronics 41 is associated with a rechargeable battery 43, by means of which the electrical energy flow 19 for feeding into the mechanical energy flow 17 can be generated. In the reverse case, thus for branching off the electrical energy flow 19, surplus energy can be saved in the battery 43 for later use. The saving method is designated as recuperation and the release of the energy as boosting.

The rotor 23 of the electrical energy converter 15 is associated with a hollow shaft 45. The hollow shaft 45 is non-rotatably associated with the internal conical sun wheels 35 of the first transmission stage 25 and second transmission stage 27. The hollow shaft 45 is rotatably mounted by means of the internal conical sun wheels 35 in the axial and radial direction. To feed the electrical energy flow 19 into the mechanical energy flow 17, the rotor 23 and the hollow shaft 45 can be driven by means of the electrical energy converter 15. For the reverse method, the rotor 23 and the hollow shaft 45 can be retarded accordingly. In addition, a corresponding magnetic field can be generated between the stator 21 and the rotor 23 by means of the power electronics 41.

Figure 2:
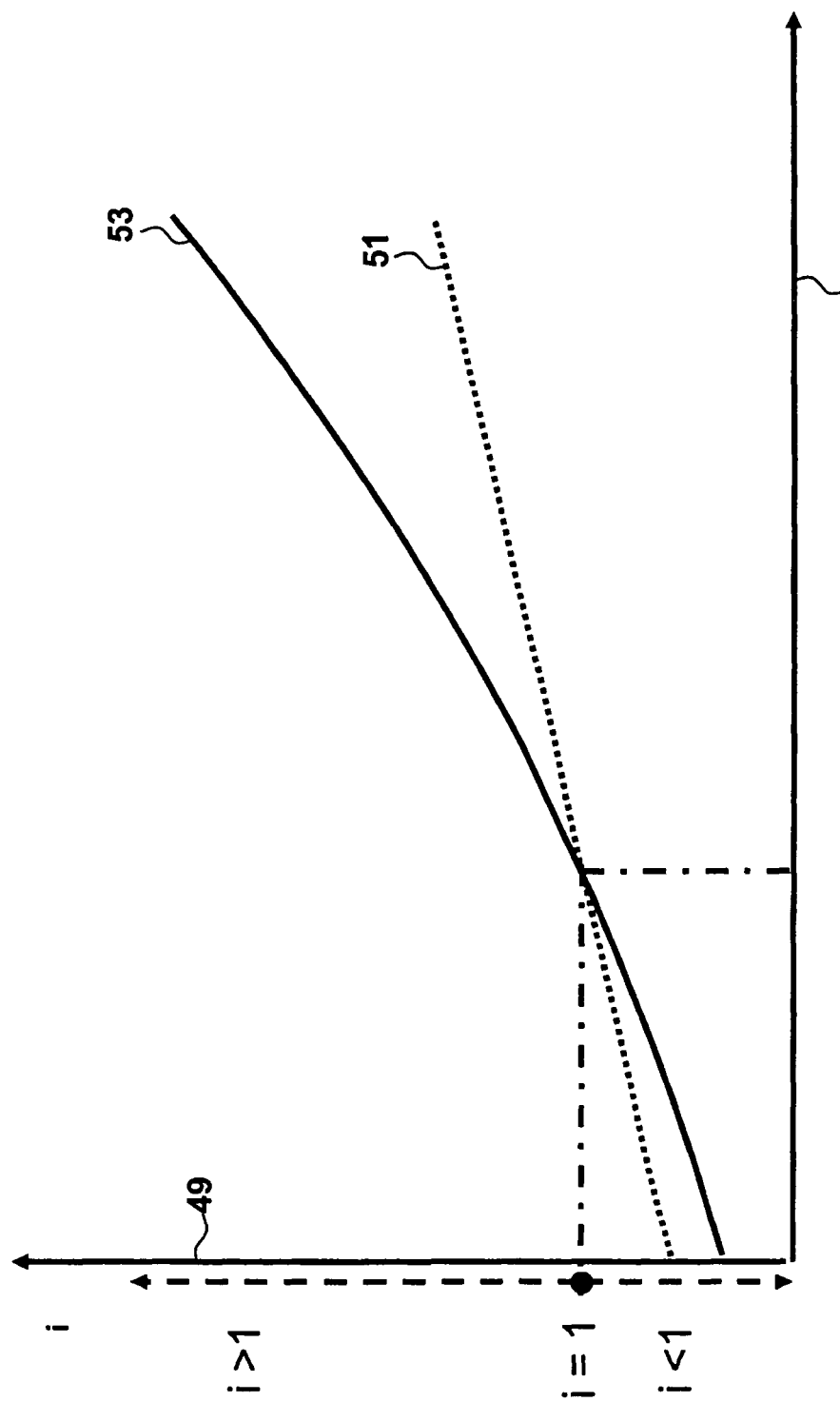
FIG. 2 a possible transmission ratio characteristic of the planetary gear transmission of FIG. 1 as a function of the rotational speed of an exhaust gas turbine of the turbocharger shown in FIG. 1.

FIG. 2 shows a transmission ratio characteristic of the mechanical energy converter 9 shown in FIG. 1 over an exhaust gas turbine speed. The exhaust gas turbine speed is shown on x-axis 47. On y-axis 49, the transmission ratio is plotted, whereby, by means of a dash-dotted line, a transmission ratio of i=1 is plotted in FIG. 2. Beneath the dash-dotted line, a fast transmission rate with i<1 is provided. Above the dash-dotted line, a slow transmission rate with i>1 is provided. A first curve 51, shown as a dotted line in FIG. 2, shows the transmission ratio of one of the transmission stages 25 and 27. By means of second curve 53, which is shown in FIG. 2 as a continuous line, an entire transmission ratio of both transmission stages 25 and 27 is represented together, thus, the mechanical energy converter 9. It is to be recognized that at a comparatively low exhaust-gas turbine speed, transmission into high speed and in a comparatively large exhaust-gas turbine speed, transmission into the low speed occurs.

FIG. 3 shows different speed characteristics of the transmission stages 25 and 27 over an engine speed of the internal combustion engine 3. On x-axis 47, the engine speed of the internal combustion engine 3 is plotted. On y-axis 49, the speeds of the transmission stages 25 and 27 and of the rotor 23 are plotted. A third curve 55 that is plotted in FIG. 3 as a coarsely dashed line represents the exhaust-gas turbine speed plotted over the engine speed. A fourth curve 57 that is plotted finely dotted in FIG. 3 represents the speed of rotor 23 of the electrical energy converter 15 over the engine speed. A fifth curve 59, which is plotted in FIG. 3 as a continuous line, represents the speed of the compressor 11 over the engine speed of the internal combustion engine 3. The speed characteristics of FIG. 3 are set by means of the variably adjustable transmission of the mechanical energy converter 9. It is to be recognized that with increasing engine speed the compressor speed of the fifth curve 59 initially increases disproportionately in comparison with the exhaust-gas turbine speed shown by means of the third curve 55. With a further increase of engine speed, compressor speed behaves underproportionately to the exhaust-gas turbine speed, in order to decrease again with further increase of engine speed. Advantageously, through these speed characteristics, the amount of energy contained in the exhaust gas flow 5 can be taken optimally by means of the exhaust gas turbine 7, whereby, advantageously, exhaust gas counter pressure also does not become too much for the internal combustion engine 3.

Figure 4:
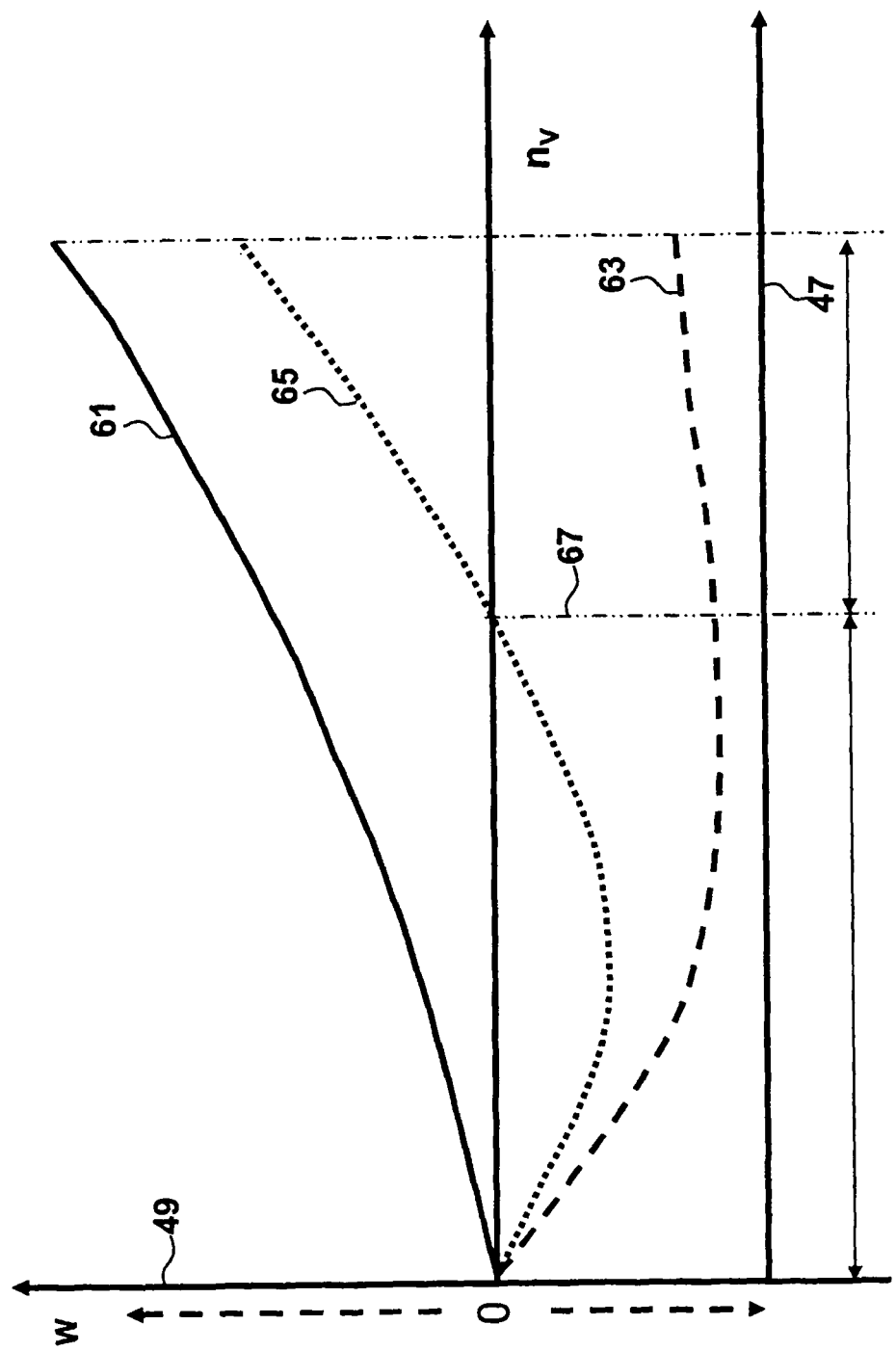
FIG. 4 characteristics of different energy flows of the turbocharger represented in FIG. 1 as a function of the engine rotational speed.

FIG. 4 shows a representation of the mechanical energy flow 17 as well as the electrical energy flow 19 plotted over the engine speed. Moreover, an exhaust gas energy flow that can be drawn from exhaust gas flow 5 by means of the exhaust gas turbine 7 is plotted. On x-axis 47, the engine speed is plotted. Output power is plotted on y-axis 49. By means of a sixth curve 61 that is plotted in FIG. 4 as a continuous line, the exhaust gas energy flow that can be drawn from the exhaust gas flow 5 by means of the exhaust gas turbine 7 is plotted. By means of a seventh curve 63 the mechanical energy flow 17 is plotted, as it is available to the compressor 11. The seventh curve 63 is shown as a coarsely dashed line in FIG. 4. By means of an eighth curve 65, which is finely dotted in FIG. 4, the branched-off electrical energy flow 19 is plotted. It is to be recognized that the mechanical energy flow 17 at disposal to the compressor 11 of the seventh curve 63 results from the output power of the exhaust gas turbine 7 of the of sixth curve 61 and of the electrical energy flow 19 of the electrical converter 15. By means of a dash-dotted line in FIG. 4, a threshold speed 67 of the engine speed of the internal combustion engine 3 is shown. It is to be recognized that beneath the threshold speed 67 the electrical energy flow 19 of the eighth curve 65 assumes a negative value or includes the same sign, that of the compressor capacity shown by the seventh curve 63 of the mechanical energy flow 17. That condition corresponds to boost operation, whereby the electrical energy flow 19 is added to the energy flow derived by means of the exhaust gas turbine 7, thus additionally at the disposal of compressor 11. Above the threshold speed 67, the eighth curve 65 and the seventh curve 63 have different signs, whereby energy is withdrawn from the mechanical energy flow 17, thus the excess energy gained by means of the exhaust gas turbine 9 can be stored temporarily in the battery 43 shown in FIG. 1. That manner of operation corresponds to recuperation. Advantageously, in the boost operation, as apparent in FIG. 3, the mechanical energy flow 17 can be transmitted into high speed and in recuperation operation into low speed.

Figure 5:
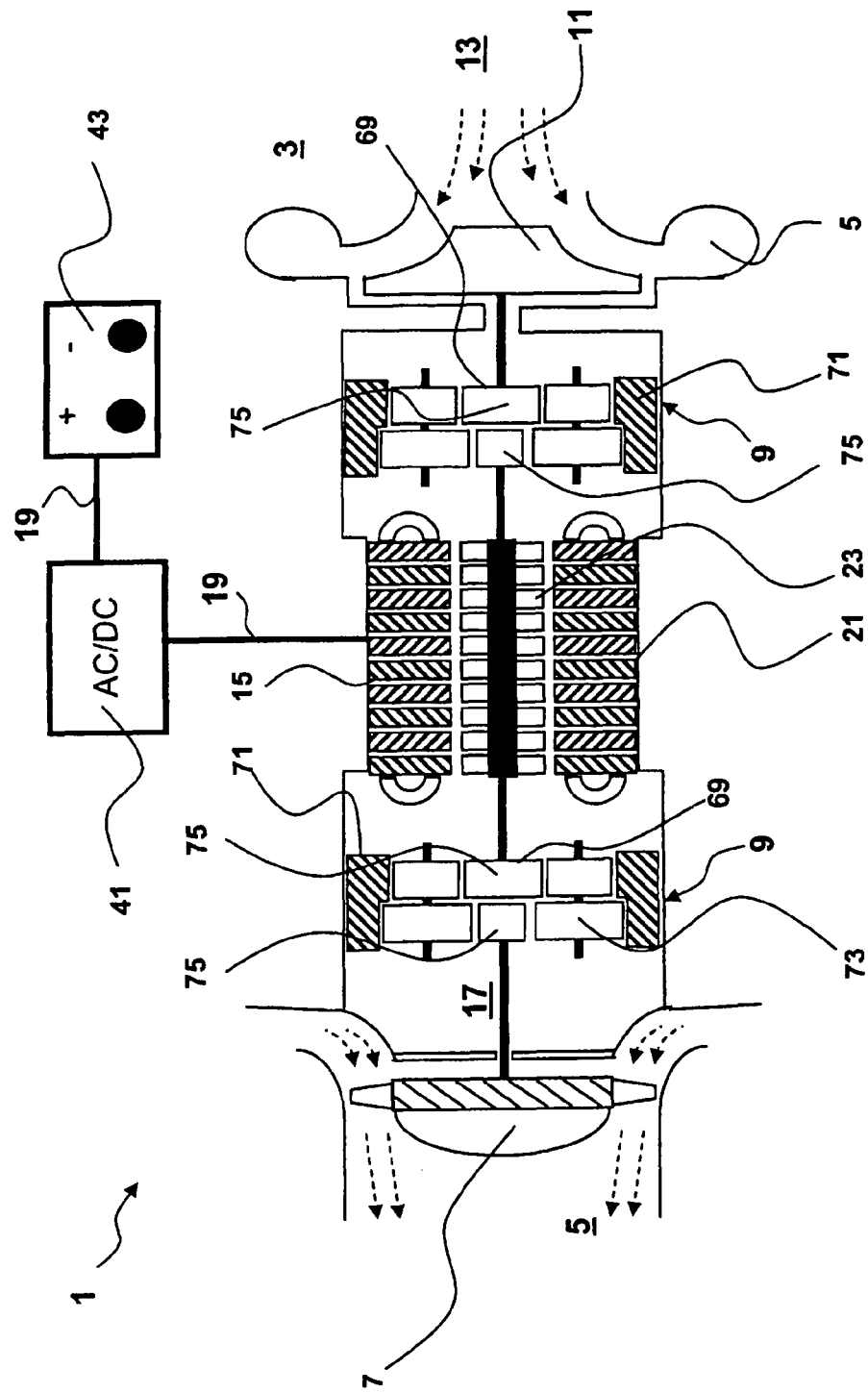
FIG. 5 a further turbocharger with two coupled planetary transmissions and an electric motor.

FIG. 5 shows a further turbocharger 1 with an electrical energy converter 15 and a mechanical energy converter 9. In contrast, the mechanical energy converter 9 includes two respectively coupled two-stage planetary gear transmissions 69. The planetary gear transmissions 69 can be executed as frictional or toothed transmissions. The planetary gear transmissions 69 are designed such that the compressor 11 runs faster than the exhaust gas turbine 7. Each of the planetary gear transmissions 69 includes a double ring gear 71 that is non-rotatably associated with the housing of the turbocharger 1. Correspondingly, each of the planetary gear transmissions 69 includes a plurality of coupled double planetary gears 73 as well as centrally disposed sun gears 75. Analogously to the representation in accordance with FIG. 1, the rotor 23 is associated with respective ones of the sun wheels 75, thus connected between the two planetary gear transmissions 69 of the mechanical energy converter 9.

Figure 6:
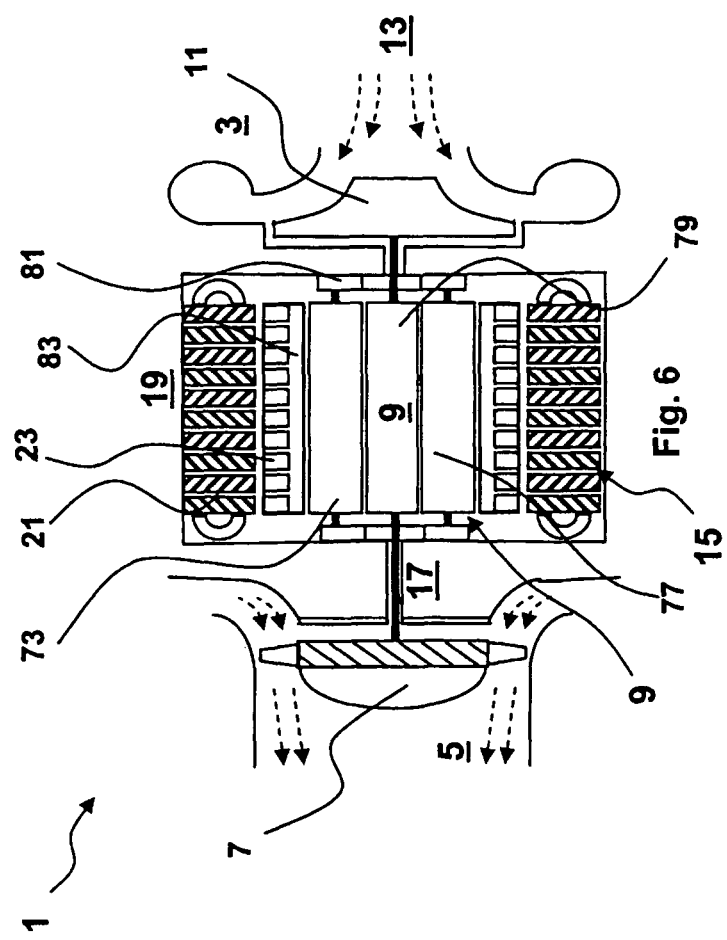
FIG. 6 a further turbocharger with two planetary transmissions and an electric motor.

FIG. 6 shows a further turbocharger 1 with a mechanical energy converter 9 and an electrical energy converter 15. In contrast to the embodiments in accordance with FIGS. 1 and 5, a single stage planetary gear transmission 77 of the mechanical energy converter 9 is connected between the exhaust gas turbine 7 and the compressor 11. The exhaust gas turbine 7 is non-rotatably coupled with a sun gear 79 of the planetary transmission 77 and with the compressor 11. A carrier 81 of the planetary transmission 77 is non-rotatably coupled with the housing of the turbocharger 1. As a further difference, the rotor 23 of the electrical energy converter 15 is non-rotatably coupled with a ring gear 83 of the planetary transmission 77 or is integrated with it.

Figure 7:
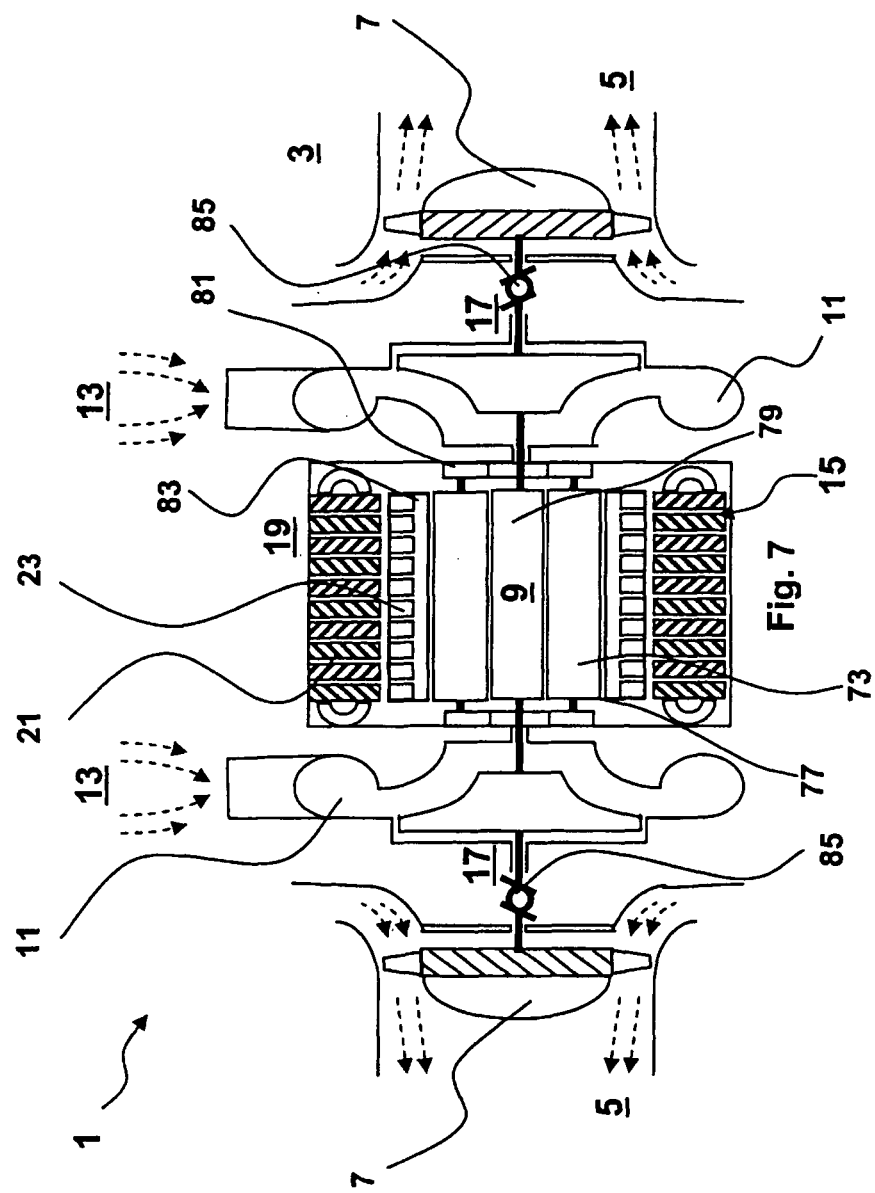
FIG. 7 a tandem turbocharger with two planetary transmissions and an electric Motor.

FIG. 7 shows a further turbocharger 1 with a mechanical energy converter 9 and an electrical energy converter 15. In contrast, the turbocharger 1 is designed as a tandem turbocharger with two exhaust gas turbines 7 and two compressors 11. The mechanical energy converter 9 as well as the electrical energy converter 15 is executed analogously to the description of FIG. 6, whereby, in contrast, the two compressors 11 are non-rotatably associated with the sun gear 79.

As a further difference, the exhaust gas turbines 7 are selectively associated with the respective compressors 11, either non-rotatably or running freely as a freewheel 85.

Figure 8:
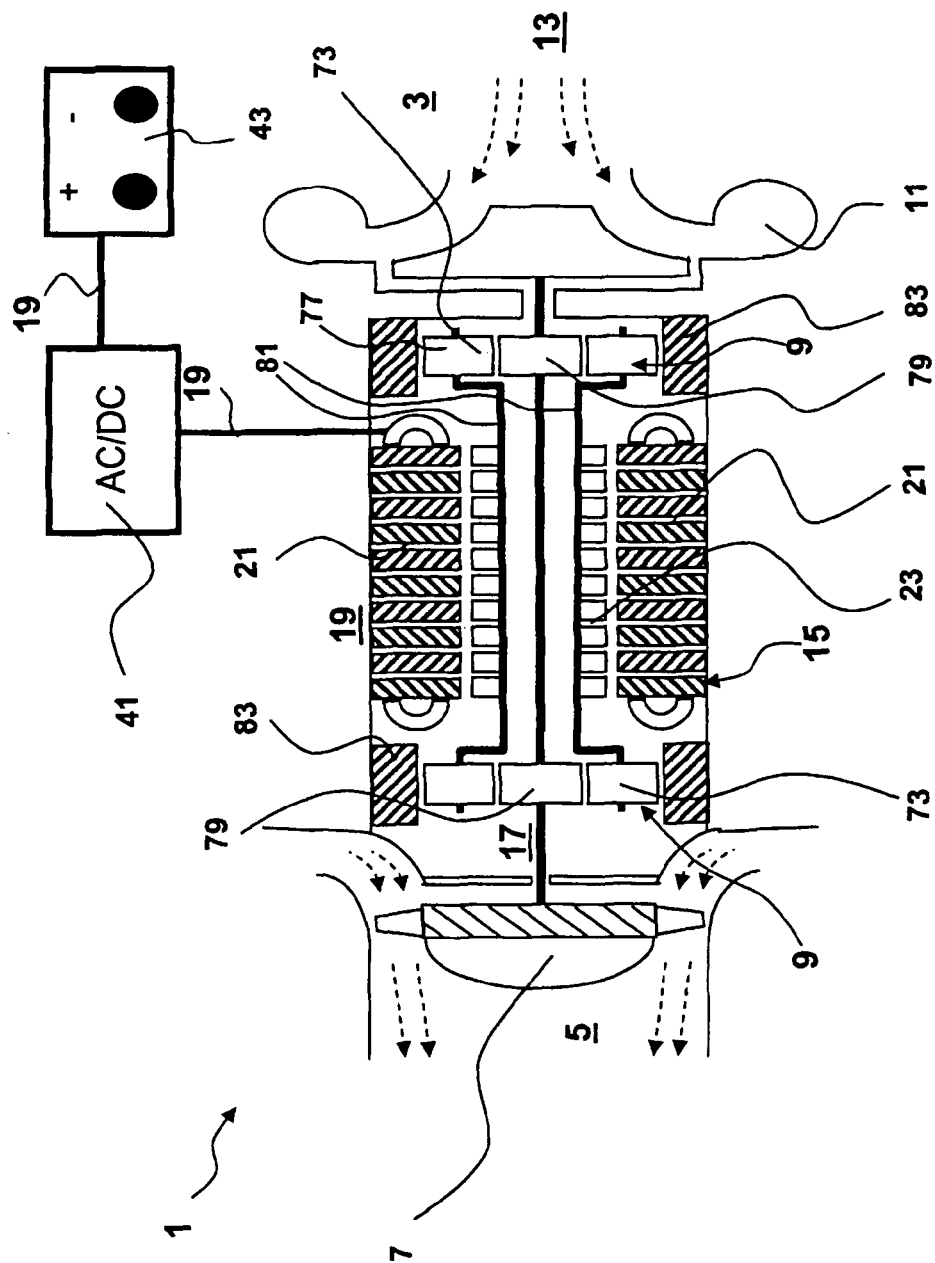
FIG. 8 a further turbocharger with a planetary gear transmission and an electric motor.

FIG. 8 shows a further turbocharger 1 with a compressor 11 and an electrical energy converter 15. The compressor 11 and the exhaust gas turbine 7 as well are assigned analogously to the depiction of FIGS. 6 and 7 non-rotatably on the common-shaft sun gears 79 of the planetary transmission 77. In contrast to the depiction of FIGS. 6 and 7 is the sun gears 79 split, thus it includes two gears connected via a shaft. A plurality of the planetary gears 73 is associated with each of the sun gears 79. As a further difference, two ring gears 83 are provided, which are non-rotatably associated with the housing of the turbocharger 1. The planetary gears 73 are thus mounted rotatably relative to the housing of the turbocharger 1, whereby the crosspiece 81 assigns the planetary gears 73 to one another in pairs. Furthermore, the rotor 23 is associated with the crosspiece 81 of the electrical energy converter 15, so that it rotates synchronously with the crosspiece 81 and hence with the planetary gears 73. The rotor 23 is disposed between the planetary gears 73. The stator 21 is assigned non-rotatably to the housing of the turbocharger 1. Advantageously, during acceleration from low speeds, thanks to the electrical energy flow 19, a desired higher charging pressure can be generated, which acts against the so-called turbo lag. Advantageously, in the contrary case, at higher engine speeds, the electrical energy flow 19 can be branched off so that the compressor 11 must not be operated over its delivery limit and/or mechanical as well as thermal loading capacity. Advantageously, charging pressure control by blowing off the excess compressed air upstream of the compressor 11 can be dispensed with since excess mechanical energy of the mechanical energy flow 17 is branched off into the electrical energy flow 19 and can be fed into the battery 43 for the so-called recuperation operation. Advantageously, by also blowing off the excess compressed air, far-reaching serious disadvantages, for instance, a steeper speed increase of the exhaust gas turbine 7 can be avoided.

The electrical energy converter 15 of FIG. 1 is mounted on the two transmission stages 25 and 27 of the mechanical energy converter 9. The stepless transmission change of the mechanical energy flow on the one hand, and a radial roller bearing for the exhaust gas turbine 7, the compressor 11, as well as the rotor 23 on the other hand, can be provided advantageously by means of the transmission stages 25 and 27. The rotor 23 is assigned non-rotatably by means of the hollow shaft 45 to the internal conical sun wheels 34 of the transmission stages 25 and 27. The stator 21 is connected non-rotatably with the housing of the turbocharger 1. The exhaust gas turbine 7 is connected non-rotatably with the external bevel sun wheel 37 of the first transmission stage 25. The compressor 11 is connected non-rotatably with the external bevel sun wheel 37 of the second transmission stage 27. The ring gears 31 of the first transmission stage 25 and second transmission stage 27 are assigned non-rotatably to the housing of turbocharger 1, and correspond to the double arrows 29 in an axially displaceable manner.

At low engine speeds of the internal combustion engine 3, the transmission of the mechanical energy converter 9, thus of the transmission stages 25 and 27, is set at high, which is apparent in FIG. 3. The compressor 11 rotates faster than the exhaust gas turbine 7. Because in this operating state of the internal combustion engine 3, the exhaust gas flow 5 or an energy flow of the exhaust gas flow 5 is too weak, as shown in FIG. 4 the electrical energy flow 19 can be fed advantageously into the mechanical energy flow 17 by means of the electrical energy converter 15, whereby, acceleration of the compressor 11 is advantageously possible by means of the additional energy at disposal. With increasing engine speed of the internal combustion engine 3, the transmissions of the stages 25 and 27 are set at low speed, in order to operate the compressor 11 at constant speed, which is evident in FIG. 3. At higher engine speeds of the internal combustion engine 3, excess energy of the exhaust gas flow is converted into electrical energy, thus the electrical energy flow in a so-called recuperation operation, which is evident in FIG. 4.

The turbocharger 1 shown in FIG. 5 includes the two-stage planetary gear transmission 69 as a mechanical energy converter 9, which can be executed as a toothed or a frictional planetary transmission. The compressor 11 is coupled non-rotatably with the neighboring sun gear 75. The double ring gears 71 are connected non-rotatably with the housing of the turbocharger 1. Two internal sun gears 75 are connected non-rotatably with the rotor 23 of the electrical energy converter 15. The stator 21 of the electrical energy converter 15 is connected non-rotatably with the housing of the turbocharger 1. The exhaust-gas turbine 7 is connected non-rotatably with the neighboring sun gear 75. The transmission of the altogether four-stage planetary transmission 69 is arranged such that the compressor 11 rotates faster than the exhaust-gas turbine 7. The rotor 23 is connected between a second and a third step of the planetary transmission 69. At low engine speeds, the electrical energy converter 15 can rotate the rotor 23 and hence accelerate the compressor 11, which corresponds to a booster. In recuperation operation, thus for increasing engine speeds of the internal combustion engine 3, excess mechanical energy of the mechanical energy flow 17 is branched off into the electrical energy flow 19, and is then transformed into electrical energy.

FIG. 6 shows the turbocharger 1 with the planetary gear transmission 77 that can also be executed as a frictional or a gear planetary transmission. The exhaust-gas turbine 7 is connected non-rotatably with a sun gear 79 of the planetary transmission 77 and with the compressor 11. The carrier 81 of the planetary transmission 77 is connected non-rotatably with the housing of the turbocharger 1. The rotor 23 of the electrical energy converter 15 is integrated in the ring gear 83, or the rotor 23 and the ring gear 83 are connected together non-rotatably. The stator 21 is connected non-rotatably with the housing of the turbocharger 1. Boosting and recuperation occur analogously to the turbocharger 1 shown in FIG. 5.

The turbocharger executed as a tandem turbocharger 1 is shown in FIG. 7. The two exhaust gas turbines 7 are each connected with a respective freewheel 85.

Alternatively, and/or additionally, freewheels 85 can be executed as friction clutches. Freewheels 85, the two compressors 11 and the sun gear 79 are connected with one another non-rotatably. The carrier 81 is assigned non-rotatably to the housing of the turbocharger 1. The rotor 23 of the electrical energy converter 15 is integrated in the ring gear 83, or the rotor 23 and the ring gear 83 are connected together non-rotatably.

The stator 21 is connected non-rotatably with the housing of the turbocharger 1. Alternatively, and/or additionally, it is possible to replace freewheels 85 with stiff couplings or dispense with them.

At low engine speeds of the internal combustion engine 3, the electrical energy converter 15 accelerates the rotor 23 or the ring gear 83, and via the planetary gear transmission 77 also the compressor 11, which corresponds to boosting. In this operating state, the speeds of the two compressors 11 are faster than that of the exhaust gas turbine 7 because the exhaust gas turbines 7 are disconnected by means of the freewheels 85. With increasing engine speed of the internal combustion engine 3, the speed of the exhaust gas turbine 7 increases. Upon equalization of both speeds, freewheel 85 establishes a connection. From this moment, the exhaust gas turbines 7, or the exhaust gas turbines 7 and the electrical energy converter 15, accelerate the compressors 11. As soon as the mechanical energy provided by means of the exhaust gas turbines 7 exceeds a certain value, the electrical energy flow 19 can be branched off in recuperation operation.

FIG. 8 shows the turbocharger 1 with the planetary transmissions 77 that can also be executed as a gear or frictional planetary transmissions. In contrast to the representation in accordance with FIG. 7, the components of the planetary transmissions 77 are provided in respective pairs. The sun gears 79 of the planetary transmission 77 connected with the exhaust gas turbine 7 and of the planetary transmission 77 connected with the compressor 11 are non-rotatably connected together. The exhaust gas turbine 7 can be connected non-rotatably or, alternatively, via a freewheel 85, analogously to the arrangement shown in FIG. 7, with the sun gears 79 and the compressor 11. The carrier 81 of the planetary transmissions 77 is non-rotatably connected with the rotor 23 of the electrical energy converter 15. The ring gears 83, likewise provided in pairs, and the stator 21 of the electrical energy converter 15 are non-rotatably connected with the housing of the turbocharger 1. Boosting and recuperation occur analogously to the description of the preceding FIGS. 6 and 7.

Advantageously, at low engine speeds, the efficiency of the internal combustion engine 3 can be increased, and hence the fuel consumption can be improved. Unused energy from the exhaust gas flow can advantageously be fed to the battery 43 for later utilization, for instance during boost operation.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A turbocharger for an internal combustion engine, in which mechanical energy flow is generated from engine exhaust gas flow and is fed to provide intake airflow to the internal combustion engine, said turbocharger comprising:
    an exhaust gas turbine positioned for receiving engine exhaust gas from an externally-positioned internal combustion engine, wherein the exhaust gas turbine is operative for providing mechanical energy from the engine exhaust gas;
    an intake airflow compressor positioned at an engine intake airflow conduit of the externally-positioned internal combustion engine for providing air under pressure to the externally-positioned internal combustion engine;
    a mechanical energy converter connected between the exhaust gas turbine and the intake airflow compressor for receiving mechanical energy provided by the exhaust gas turbine and for providing mechanical energy to the intake airflow compressor; and
    a rotatable electrical energy converter operatively connected with the mechanical energy converter for receiving mechanical energy from the exhaust gas turbine and for converting received mechanical energy output into electrical energy, wherein the electrical energy converter is operative for converting received electrical energy from an electrical energy accumulator into mechanical energy for supply to the mechanical energy converter and to the intake airflow compressor, whereby a flow of electrical energy from the electrical energy converter can be selectively branched to the electrical energy accumulator from a received flow of mechanical energy by the electric energy converter, and whereby a flow of electrical energy can be provided to the electrical energy converter from the electrical energy accumulator to drive the intake airflow compressor.

2. A turbocharger in accordance with claim 1, wherein the mechanical energy converter includes a variable speed planetary transmission having a continuously variable transmission ratio.

3. A turbocharger in accordance with claim 2, wherein the variable speed planetary transmission includes a first transmission stage and a second transmission stage, and wherein the electrical energy converter is disposed between the first and second transmission stages.

4. A method for operating a turbocharger for an internal combustion engine, the turbocharger including an exhaust gas turbine, an intake airflow compressor, a rotatable mechanical energy converter connected between the exhaust gas turbine and the intake airflow compressor, and an electrical energy converter operatively connected with the mechanical energy converter, said method comprising the steps of:
    operating the turbocharger from engine exhaust gas to rotate the exhaust gas turbine to generate mechanical energy;
    supplying mechanical energy generated by the exhaust gas turbine to the rotatable electrical energy converter for generating electrical energy by rotating the electrical energy converter;
    selectively branching off a flow of electrical energy from the electrical energy converter to an electrical energy accumulator during a first operating condition of the internal combustion engine; and
    selectively supplying electrical energy from the electrical energy accumulator to the rotatable electrical energy converter for rotating the electrical energy converter to provide to the intake airflow compressor mechanical energy to supplement mechanical energy generated by the exhaust gas turbine and for supplying supplemental rotational power input to the intake airfow compressor during a second operating condition of the internal combustion engine.

5. A method in accordance with claim 4, including the step of:
    steplessly transmitting mechanical energy flow to the intake airflow compressor through a variable planetary gear transmission having a continuously variable transmission ratio.

6. A method in accordance with claim 4, including the steps of:
    transmitting additional mechanical energy to the intake airflow compressor to supplement mechanical energy provided to the intake air compressor by the exhaust gas turbine when the rotational speed of the internal combustion engine falls below a threshold engine rotational speed by feeding a flow of electrical energy to the electrical energy converter to operate the electrical energy converter as a motor for driving the intake air compressor; and
    transmitting mechanical energy not needed for driving the intake air compressor to the electrical energy accumulator when engine rotational speed of the internal combustion engine exceeds the threshold speed by branching off electrical energy flow from the electrical energy converter to the electrical energy accumulator.

7. A method in accordance with claim 4, including the step of:
    steplessly transmitting mechanical energy to the intake airflow compressor so that the speed of the intake airflow compressor associated with an engine intake airflow volume over an increasing speed characteristic of the internal combustion engine, relative to the speed of the exhaust gas turbine associated with the exhaust gas flow, first increases disproportionately, then increases again under-proportionately, and thereafter decreases slightly.

8. A method in accordance with claim 7, including the step of:
    controlling a flow of electrical energy from the electrical energy converter and transmitting resulting additional mechanical energy to the exhaust gas turbine so that the exhaust gas turbine speed increases proportionally to internal combustion engine speed.

9. A method in accordance with claim 4, including at least one of the following steps:

selectively branching a flow of electrical energy from the electrical energy converter to an electrical energy source;

selectively branching a flow of electrical energy from the electrical energy converter to an electrical energy sink and selectively branching a flow of electrical energy from the electrical energy converter to a rechargeable battery.

10. A method in accordance with claim 4, including the steps of:

controlling flow of electrical energy by an electrical energy control component; and controlling operation of the electrical energy converter by the electrical energy control component.

11. An internal combustion engine including a turbocharger in accordance with claim 1.

12. An internal combustion engine in accordance with claim 11, wherein the turbocharger is operated from engine exhaust gas to drive the exhaust gas turbine to generate mechanical energy;

wherein mechanical energy generated by the exhaust gas turbine is supplied to the electrical energy converter for generating electrical energy by the electrical energy converter;

wherein a flow of electrical energy is selectively branched off from the electrical energy converter to an electrical energy accumulator during a first operating condition of the internal combustion engine; and wherein electrical energy is selectively supplied from the electrical energy accumulator to the electrical energy converter for providing mechanical energy to supplement mechanical energy generated by the exhaust gas turbine during a second operating condition of the internal combustion engine.

13. A turbocharger in accordance with claim 1, wherein the mechanical energy converter is a two-stage planetary gear transmission.

14. A turbocharger in accordance with claim 1, including a tandem turbocharger including two exhaust gas turbines and two intake airflow compressors, each connected to provide a pair of parallel flow turbochargers, including a unitary mechanical energy converter positioned between and connected with each of the turbochargers.

15. A turbocharger in accordance with claim 14, including two respective planetary gear transmissions, wherein the intake airflow compressors are each non-rotatably connected with a common sun gear of the respective planetary gear transmissions.

16. A turbocharger in accordance with claim 14, wherein respective exhaust gas turbines are operatively connected with respective intake airflow compressors through respective freewheels.

* * * * *